(12) United States Patent  (10) Patent No.: US 6,234,293 B1
Fasoli  (45) Date of Patent: May 22, 2001

(54) CONVEYOR-BELT ROLLER ASSEMBLY

(75) Inventor: Luigi G. Fasoli, Irricana (CA)

(73) Assignee: Luff Industries Ltd., Calgary (CA)

( * ) Notice: Subject to any disclaimer, the term of this patent is extended or adjusted under 35 U.S.C. 154(b) by 0 days.

(21) Appl. No.: 09/360,035

(22) Filed: Jul. 23, 1999

(51) Int. Cl.$^7$ .................................................. B65G 13/00
(52) U.S. Cl. ............................................................. 193/37
(58) Field of Search ........................ 198/780; 193/35 R, 193/37

(56) References Cited

U.S. PATENT DOCUMENTS

| | | | |
|---|---|---|---|
| 1,742,453 | * 1/1930 | Van Derhoef | 193/37 |
| 1,850,891 | 3/1932 | Nyborg . | |
| 3,038,590 | 6/1962 | Arndt . | |
| 3,793,689 | * 2/1974 | Specth | 193/37 |
| 3,894,323 | 7/1975 | Hamlen . | |
| 4,312,444 | 1/1982 | Mushovic . | |
| 4,344,218 | 8/1982 | Hooper et al. . | |
| 5,190,146 | 3/1993 | Valster et al. . | |
| 5,261,528 | * 11/1993 | Bouchal | 193/37 X |
| 5,383,549 | 1/1995 | Mayer . | |
| 5,944,161 | * 8/1999 | Sealey | 193/37 |
| 6,053,298 | * 4/2000 | Nimmo et al. | 193/37 |

FOREIGN PATENT DOCUMENTS

| | | | |
|---|---|---|---|
| 1187030 | * 5/1985 | (CA) | 193/37 |
| 59270 | * 9/1982 | (EP) | 193/37 |
| 1810241 | * 4/1993 | (SU) | 193/37 |

* cited by examiner

Primary Examiner—James R. Bidwell
(74) Attorney, Agent, or Firm—Jenkens & Wilson, P.A.

(57) ABSTRACT

A conveyor-belt roller assembly secured inside a conveyor-belt roller and onto an inner shaft, preferably used in conveyor-belts used for carrying high loads of material in hazardous environments. The conveyor-belt roller assembly has a stationary anti-lock shield which protects the rotating exterior surface from coming into contact with the outside elements for example debris and machinery. A dust shield is also position aft of the anti-lock shield to prevent the penetration of small particles and dust into the inner workings of the conveyor-belt roller assembly. The conveyor-belt roller assembly also has deep rings in the load-bearing portion for thermal expansion and contraction as well as heat dissipation. Bridging ribs are positioned across the deep rings to greatly increase the strength and therefore load-baring capacity of the conveyor-belt roller assembly. A tapered labyrinth seal is used so that it can be press locked into position making installation quicker and easier. The main load-baring component and tapered labyrinth seal component are preferably fabricated from a high strength, heat resistant 30% glass filled polypropylene.

10 Claims, 3 Drawing Sheets

CONVEYOR-BELT ROLLER ASSEMBLY

FIELD OF THE INVENTION

The present invention is related to a roller for use with a conveyor-belt, particularly conveyor-belts for handling heavy loads in potentially dangerous environments.

BACKGROUND OF THE INVENTION

A conveyor-belt roller assembly is a roller like device, which fits inside either end of a cylindrical roller tube of a conveyor-belt, and carries the cylindrical roller tube while being mounting on and rotating around an inner shaft, thus allowing rotation of the cylindrical roller tube. It is well known that conveyor-belt roller assemblies must withstand incredible pressure from the great loads that they carry. Other characteristics of the roller assemblies are that they must withstand severe bombardment from the elements, function within a potentially hazardous environment and remain as reliable and maintenance free as possible so as to be safe when used and to be financially beneficial. Although the requirements for a conveyor-belt roller assembly are known, producing an assembly that complies with all of the above parameters has yet to be accomplished.

One such attempt is U.S. Pat. No. 5,261,528 which discloses a conveyor-belt roller assembly that is enclosed with a ring assembly. The cylinder operates on ball bearings and uses a straight labyrinth seal in conjunction with a felt insert sealing the bearings from the atmosphere while providing a lubricating environment for the components sealed within the roller. The entire assembly, like most, is press fit into a cylindrical shell of the roller. However, the load-bearing component of the assembly comprises very few strengthening characteristics and is too easily broken under heavy load. The outermost surface of the assembly exposed to the elements rotates with the head and no protection barrier is provided to prevent the outside environment from coming into contact with the rotating part and potentially stopping or interfering with the assembly's rotation. The stoppage of rotation is extremely costly in that there is potential for damage to be caused to the cylindrical roller and roller assembly as well as to the belt itself. Shutting down the conveyor-belt to replace broken roller assemblies can result in a huge financial penalty, therefore protection of the roller assembly and the rotating parts is extremely important.

Another attempt is U.S. Pat. No. 5,383,549 which discloses a conveyor-belt cylinder assembly that is sealed with a straight labyrinth seal. As in standard construction of a roller assembly, ball bearings are once again used as a low friction way of rotating the assembly around a fixed inner shaft. A small dust cap is fitted over the end of the straight labyrinth seal to help prevent dust and dirt buildup. However, the base of the assembly, which in this particular instance represents the load-bearing portion of the assembly, has little or no strengthening characteristics and can support only a limited load. In addition, the exterior rotating end of the assembly is open to the outside environment, and nothing prevents the external environment from coming into contact with and disrupting or stopping the rotation of the roller assembly.

Up until now, the standard material used in the construction of conveyor-belt roller assemblies was a variety of high-strength, fire resistant plastic materials such as ABS™, sometimes in conjunction with metal and urethane components. Although the older materials functioned in a capacity, the capacity was limited. An improved material is used in the conveyor-belt roller assembly of the present invention. More specifically, for example, the inner labyrinth seal and the polycap are preferably made of a composition consisting of 30% glass filled polypropylene. The 30% glass filled polypropylene increases strength and is far more heat resistant as, for example, the following figures indicate:

| Property Data | Unit | 30% Glass Filled Polypropylene |
|---|---|---|
| Tensile Strength | psi | 12,000 |
| Elongation | % | 3.5 |
| Tensile Modulus | psi × 10$^6$ | 8.5 |
| Flexural Strength | psi | 16,000 |
| Flexural Modulus | psi × 10$^6$ | 8.0 |
| Izod Impact (¼") | ft-lb/in | 1.7 |
| Rockwell Hardness | — | R105–115 |
| Specific Gravity | — | 1.13 |
| Water absorption, 24 hrs | % | 0.03 |
| Linear Mold Shrinkage | | |
| ⅛" Average Section | in/in | 0.003 |
| ¼" Average Section | in/in | 0.004 |
| Deflection Temp. Under Load | | |
| @ 264 psi | °C. | 152 |
| @ 66 psi | °C. | 159 |

Furthermore, in prior art assemblies, for example the assembly shown in U.S. Pat. No. 5,383,549, the labyrinth seal is a straight shaped seal and requires multiple assembly steps. The present invention has overcome this need for multiple steps in the assembly by tapering the inner labyrinth seal, thereby making it possible for the labyrinth seal to be press locked into position.

An additional problem of earlier models is that the exterior surface of the conveyor-belt roller assembly rotated and was exposed to the outside environment. This is dangerous in that outside elements can come into contact with the roller assembly and interfere with its rotation, possibly even stopping the rotation. The assembly was also unprotected from the elements and damage other than rotational damage could occur such that, for example, a seal could be broken or the outer and inner working components could be bent or damaged. The present invention overcomes this by the addition of an anti-lock shield used in conjunction with a rubber dust shield. The anti-lock shield is positioned outside of the roller assembly and fixed directly to the inner shaft, thereby preventing the anti-lock shield from rotating in conjunction with the roller assembly and roller. The outside leading edge of the anti-lock shield is substantially flush with the cylindrical roller making it nearly impossible for the roller assembly to come into contact with outside elements. For even more preventative measures, a rubber dust shield fits on the inside of the anti-lock shield in between the anti-lock shield and the inner workings of the roller assembly, specifically the polycap, making it even more unlikely for any outside dust or debris to penetrate the assembly. This causes an increase in the reliability of the roller assembly and decreases maintenance costs and downtime of the conveyor-belt apparatus.

Although the present invention improves in many areas, the most significant improvement comes in the polycap component, which is the main load-bearing component of the roller assembly. In the past, roller assemblies would break and crack under increased load. The current invention has overcome this by creating an all new polycap which comprises the main element of the roller assembly. The roller assembly is fitted into a cylindrical roller which guides a conveyor-belt and rotates to allow movement of the conveyor-belt. The roller assembly is fitted onto a stationary inner shaft and held in place by the polycap. Force of a load is input from the conveyor-belt through the roller and into the roller assembly where the polycap takes the force of the load. The polycap is designed, preferably out of 30% glass filled polypropylene, with two deep annular rings positioned on its posterior side toward the outer edge. Each annular ring is bridged by, preferably, sixteen strengthening ribs. The ribs are offset so that no two ribs are inline. This greatly increases the strength of the roller assembly and allows for increased load on the roller and therefore the conveyor-belt.

BRIEF SUMMARY OF INVENTION

In accordance with the current invention, the above-identified problems are overcome by the addition of an anti-lock shield element which protects the polycap and additional rotating parts from the outside environment by providing a non-rotating, strong, heat resistant external outer surface for the roller assembly that is essentially flush with the cylindrical roller. Also, present in a preferred embodiment is a new rubber dust shield, which essentially seals the polycap and labyrinth seal from dust and particles if they penetrate the anti-lock shield. The novel polycap design, preferably constructed of 30% glass filled polypropylene, has two internal annular rings bridged with offset ribs for increased roller support strength. The inner labyrinth seal is tapered, and preferably constructed from 30% glass filled polypropylene, allowing it to be press-fit into the polycap and making installation more quick and secure.

The present invention is directed to a conveyor-belt roller assembly, which fits into a conveyor-belt roller and onto a stationary inner shaft, preferably for use with high load conveyor belts in hazardous conditions. The conveyor-belt roller assembly comprises a support means, which comprises a heat dissipation and thermal expansion control means, a strengthening means, a mounting means comprising an annular shoulder positioned around the perimeter of the outside surface of said support means and a tapered inner labyrinth seal interface means. An anti-lock protection means and a dust and particle protection means are also present to help preserve the conveyor-belt roller assembly. A rotational guide means comprising ball bearings, an inner race captured on said inner shaft and remaining stationary relative to the outside environment, and an outer race captured on said support means and in rotation relative to said inner race is found in the present invention as is a labyrinth seal means.

BRIEF DESCRIPTION OF THE PREFERRED EMBODIMENTS

The present invention will be described below in detail with the aid of the accompanying drawings, in which.

DETAILED DESCRIPTION OF THE PREFERRED EMBODIMENT

Figure 1:
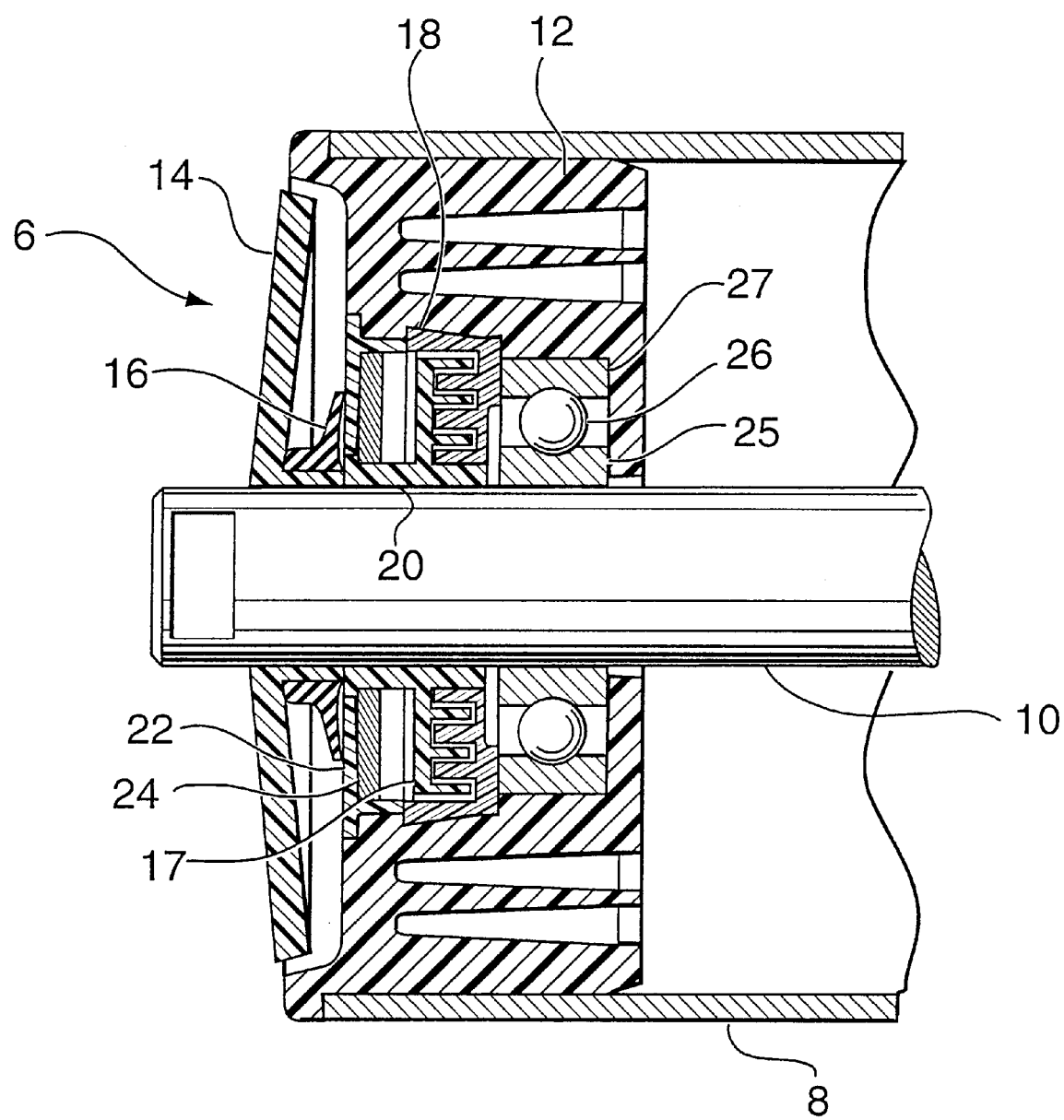
FIG. 1 is a cross-sectional view of a mounted conveyor-belt roller assembly constructed from the preferred materials.

As shown in the preferred embodiment FIG. 1, a conveyor-belt roller assembly 6 is press-fit into a metal conveyor-belt roller 8 on an inner shaft 10. The conveyor-belt roller assembly 6 comprises a polycap 12, which is the main load-bearing component of the conveyor-belt roller assembly 6. The polycap 12 will be further explained below. An anti-lock shield 14 which is stationary relative to the non-rotating inner shaft 10, protects the rotating components from being damaged and or struck by the external environment and prevents any outside elements from coming into contact with the rotating parts and potentially interfering with the rotation of the conveyor-belt roller assembly 6. A rubber dust shield 16 which when used in conjunction with the anti-lock shield 14, essentially forms a seal between the rotating parts, specifically the labyrinth seal, and prevents the penetration of dust and small particles which are able to get past the anti-lock shield. A labyrinth seal 17, comprising a tapered inner labyrinth seal 18 and an outer labyrinth seal 20 is used in the conveyor-belt roller assembly 6 in isolating the bearing lubricants from the exterior of the assembly. A felt insert 24 is placed over the labyrinth seal 17 for additional sealing. A labyrinth cover 22 is placed over the felt 24 and completes the seal. The labyrinth cover 22 and polycap 12 are the outer most surfaces which rotate. The joint between the labyrinth cover 22 and the outer labyrinth seal 20 is protected by the rubber dust shield 16 which is stationary relative to the inner shaft 10 and seals the joint from dust and particles. The rubber dust shield 16 does not apply pressure against the labyrinth cover 22, but merely is flush with it so as not to wear out either component. The conveyor-belt roller assembly rotates on low friction ball bearings 26 positioned aft of the labyrinth seal 17 in the inner race 25 and outer race 27. The inner race 25 is captured by the inner shaft 10 remaining stationary. An outer race 27 which is captured by the polycap 12 and the tapered inner labyrinth seal 18, rotates with the polycap 12.

Figure 2:
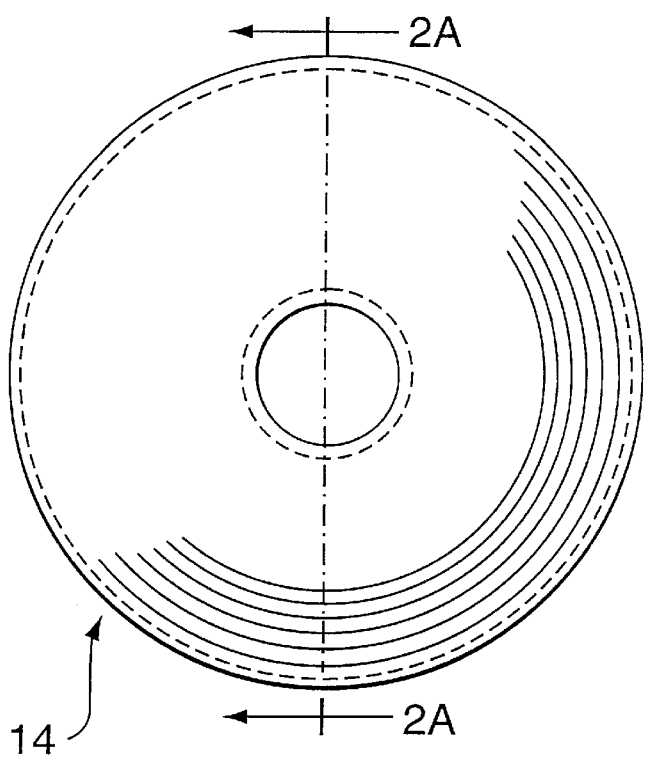
FIG. 2 is a diagrammatic view of the external surface of an anti-lock shield.
Figure 2A:
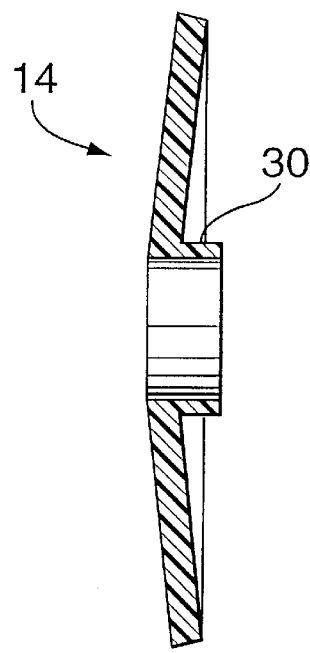
FIG. 2A is a cross-sectional view taken through 2A—2A of FIG. 2 of an anti-lock shield constructed from the preferred material.

FIG. 2 and FIG. 2A show the anti-lock shield 14 in more detail. The anti-lock shield 14 is mounted on the inner shaft 10 and is stationary relative to the inner shaft 10. The anti-lock shield is essentially flush with the roller 8 and covers, substantially, the entire outer surface of the conveyor-belt roller assembly 6. The fact that the anti-lock shield 14 is stationary is what makes it so protective against the outside elements. It is common for debris to come into contact with the conveyor-belt roller assembly when being loaded, falling during transport and when being unloaded. Tools and machines commonly present around such a conveyor-belt also often come into contact with the conveyor-belt roller assembly 6 during operation. It is these incidents of contact, which are the most common source of roller damage. The rotation of the conveyor-belt roller assembly 6 can often be interfered with during these incidents. The stopping of a roller 8 or even the slowing of the rate of rotation of a roller 8 during operation can cause damage and premature wear to the roller 8 itself, the belt and the conveyor-belt roller assembly 6. By not rotating, and covering substantially the entire outer surface of the conveyor-belt roller assembly, the anti-lock shield 14, prevents the outside elements from coming into contact with the rotating conveyor-belt roller assembly 6 and interfering with its rotation. The rubber dust shield 16 is mounted to the anti-lock shield 14 at the rubber dust shield mount location 30, and it also is stationary relative to the inner shaft 10. The rubber dust shield 16 prevents any small particles or dust that penetrates the anti-lock shield 14, from penetrating the labyrinth cover 22 and getting into the labyrinth seal 17. The rubber dust shield 16 is flush with the labyrinth cover 22 but does not press against it, which would lead to premature wear of both components and therefore shutdown and maintenance of the conveyor belt.

Figure 3:
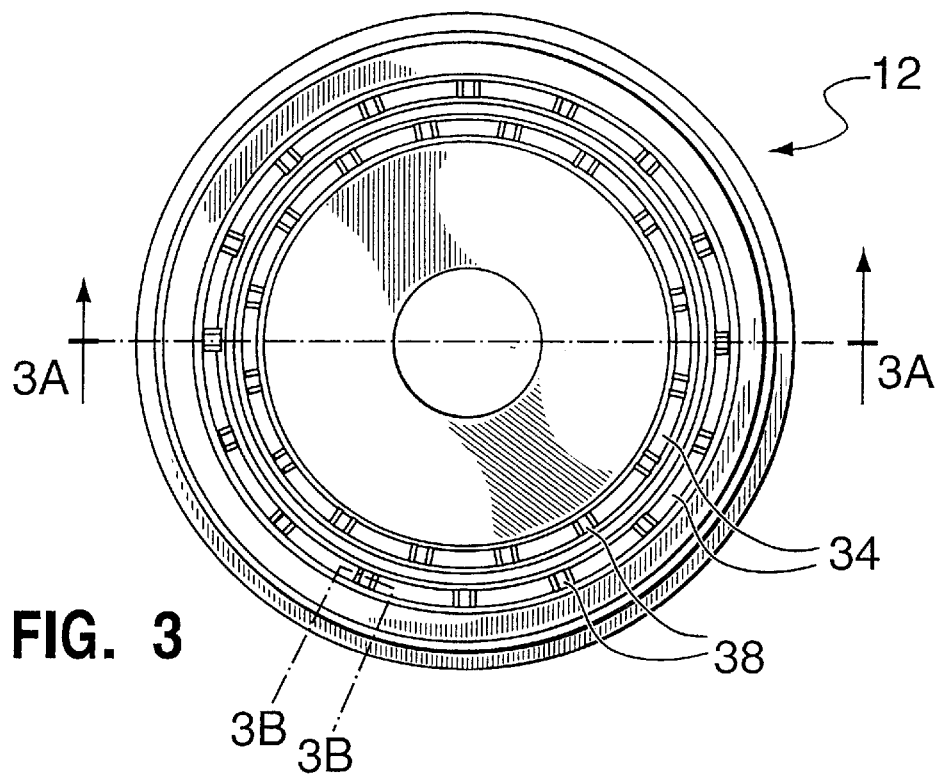
FIG. 3 is an end elevational view of the posterior side of a polycap.
Figure 3A:
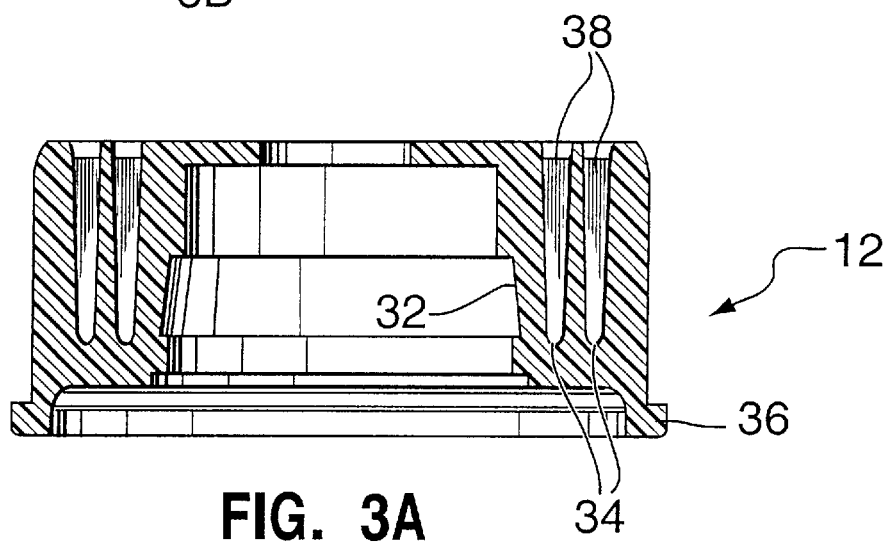
FIG. 3A is a cross-sectional view taken through 3A—3A of FIG. 3 of a polycap constructed from the preferred material.
Figure 3B:
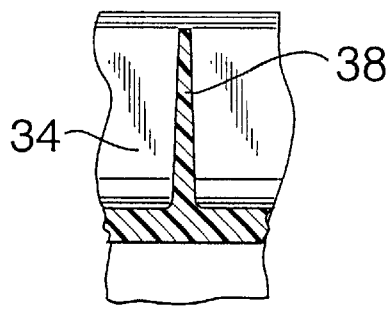
FIG. 3B is an enlarged fragmented cross-sectional view of a bridging rib positioned across an annular ring of a polycap taken through 3B—3B of FIG. 3 constructed from the preferred material.

A polycap 12, shown in FIG. 3 and FIG. 3A, preferably fabricated of 30% glass filled polypropylene, is the load-bearing component of the conveyor-belt roller assembly 6. The polycap 12 has two deep annular rings 34 positioned towards the outside of the posterior side of the polycap 12. The annular rings 34 allow for thermal expansion and contraction of the polycap 12 during extreme temperature fluctuations. The polycap 12 of this particular embodiment contains two annular rings 34 but is not limited to only two annular rings. The annular rings 34 are bridged by bridging ribs 38, more clearly shown in FIG. 3B. The bridging ribs 38 are preferably fabricated from the same material as the polycap 12 and are positioned across the annular rings 34 so as to greatly increase the load-bearing capabilities of the polycap 12. The bridging ribs 38 are preferably offset, as shown in FIG. 3 so as to more effectively distribute load and further allow for thermal expansion and contraction. This particular embodiment shows sixteen bridging ribs 38 bridging each annular ring 34 for a total of thirty-two bridging ribs 38. However, the polycap 12 is not limited to this number of bridging ribs 38.

The polycap 12 also contains a tapered inner labyrinth seal interface 32. This tapered inner labyrinth seal interface 32 is used in conjunction with the tapered inner labyrinth seal 18, and is the capture location for the tapered inner labyrinth seal 18. As the tapered inner labyrinth seal 18 has a tapered outer fitting ring it can be press locked into position thereby making installation of the labyrinth seal and the polycap quicker and easier, resulting in less downtime of the conveyor belt. The tapered inner labyrinth seal 18 will be described in more detail below. The polycap 12 also contains a polycap shoulder mount 36 which, when the conveyor-belt roller assembly 6 is mounted in a conveyor-belt roller 8, holds and locks the conveyor-belt roller assembly in position.

Figure 4:
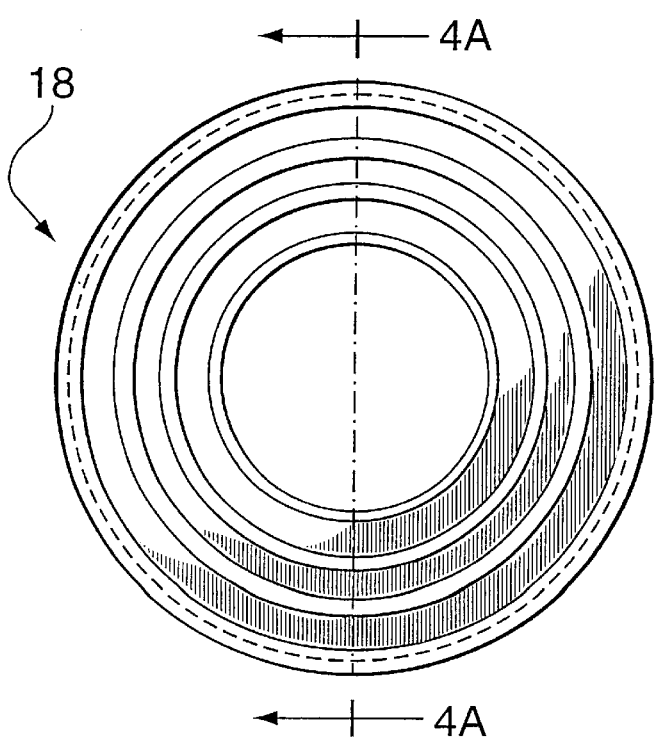
FIG. 4 is an end elevational view of a tapered inner labyrinth seal.
Figure 4A:
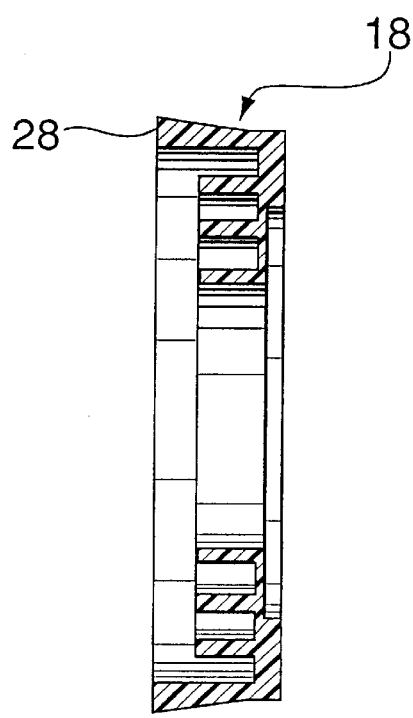
FIG. 4A is a cross-sectional view of a tapered inner labyrinth seal taken through 4A—4A of FIG. 4 constructed from the preferred material.

The tapered labyrinth seal 18, shown in FIG. 4 and FIG. 4A, has a tapered outer fitting ring 28 which is used in conjunction with the tapered inner labyrinth seal interface 32 of the polycap 12. The tapered outer fitting ring 28 enables the tapered inner labyrinth seal 18 to be press locked into position in the polycap 12. Since the inner labyrinth seal 18 is press-fit into the polycap 12, the polycap, the ball bearing assembly and the inner labyrinth seal 18 can be pre-assembled, thereby greatly shortening the time necessary to assemble the roller assembly 8.

What is claimed is:

1. A conveyor-belt roller assembly, which fits into a conveyor-belt roller and onto a stationary inner shaft, preferably for use with high load conveyor belts in hazardous situations comprising:

a) a support means, which comprises a heat dissipation and thermal expansion control means, a strengthening means, a mounting means, comprising an annular shoulder positioned around the perimeter of the outside surface of said support means and a tapered inner labyrinth seal interface means;

b) an anti-lock protection means;

c) a dust and particle protection means integral to said anti-lock protection means;

d) a rotational guide means comprising ball bearings, an inner race captured on said inner shaft and remaining stationary relative to the outside environment, and an outer race captured on said support means and in rotation to said inner race; and e) labyrinth seal means located substantially within said support means, so that said dust and particle protection means prevents dust and particles from entering said labyrinth seal means.

2. The conveyor-belt assembly of claim 1 wherein said heat dissipation and expansion control means consists of, preferably but not limited to, two concentric annular rings positioned on the posterior side of said support means, preferably substantially towards the outer perimeter of the posterior side of said support means.

3. The conveyor-belt roller assembly of claim 2 wherein said strengthening means consists of, preferably but not limited to, sixteen bridging ribs positioned across each of said annular rings.

4. The conveyor-belt roller assembly of claim 3 wherein said bridging ribs positioned across said annular rings are offset.

5. The conveyor-belt roller assembly of claim 4 wherein said tapered inner labyrinth seal interface means comprises a tapered portion positioned on the interior side of said support means wherein, when assembled, said tapered inner labyrinth seal interface means mates with a tapered inner labyrinth seal.

6. The conveyor-belt roller assembly of claim 5 wherein said anti-lock protection means consists of an anti-lock shield positioned on the outside end of said conveyor belt roller assembly and remains stationary fixed to said inner shaft.

7. The conveyor-belt roller assembly of claim 6, wherein said anti-lock shield is substantially flush with said conveyor-belt roller and covers essentially the entire exposed outer rotational surface of said conveyor-belt roller assembly.

8. The conveyor-belt roller assembly of claim 7 wherein said dust and particle protection means consists of a rubber dust shield wherein said rubber dust shield remains stationary relative to said inner shaft, mounted on the inside of said anti-lock shield and is substantially flush with the rotating components of said conveyor-belt roller assembly sealing said rotating parts from particles and dust.

9. The conveyor-belt roller assembly of claim 8 wherein said labyrinth seal means consists of a triple labyrinth seal having a tapered fitting enabling the labyrinth seal to be press locked into position into a tapered interface.

10. The conveyor-belt roller assembly of claim 9, wherein said labyrinth seal means consists of a felt insert and a labyrinth seal cover.

* * * * *